United States Patent
Bahrami et al.

(10) Patent No.: US 10,635,435 B2
(45) Date of Patent: Apr. 28, 2020

(54) COLLECTION OF API DOCUMENTATIONS

(71) Applicant: FUJITSU LIMITED, Kawasaki-shi, Kanagawa (JP)

(72) Inventors: Mehdi Bahrami, Santa Clara, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/887,896

(22) Filed: Feb. 2, 2018

(65) Prior Publication Data
US 2019/0243642 A1 Aug. 8, 2019

(51) Int. Cl.
| | |
|---|---|
| *H04L 29/08* | (2006.01) |
| *H04L 29/06* | (2006.01) |
| *G06F 9/44* | (2018.01) |
| *H04L 12/24* | (2006.01) |
| *G06Q 30/02* | (2012.01) |
| *G06F 8/73* | (2018.01) |
| *G06F 40/205* | (2020.01) |
| *G06F 40/279* | (2020.01) |

(52) U.S. Cl.
CPC .............. *G06F 8/73* (2013.01); *G06F 40/205* (2020.01); *G06F 40/279* (2020.01)

(58) Field of Classification Search
CPC ................ G06F 9/541; G06F 9/44589; G06F 2221/2141; G06F 17/30386; G06F 8/73; G06F 16/285; G06F 16/2228; G06F 16/24578; G06F 16/248; G06F 40/279; G06F 40/205; G06F 41/0803; H04L 67/02; H04L 67/34; H04L 37/306; H04L 63/105; H04L 41/0803; G06N 20/00
See application file for complete search history.

(56) References Cited

U.S. PATENT DOCUMENTS

| | | | | |
|---|---|---|---|---|
| 9,552,237 | B2 * | 1/2017 | Biesack | G06F 9/541 |
| 9,563,490 | B1 * | 2/2017 | Batinich | G06F 9/543 |
| 9,875,121 | B2 * | 1/2018 | Roth | G06F 9/45529 |
| 10,194,001 | B1 * | 1/2019 | Gardiner | H04L 67/28 |
| 2016/0026461 | A1 * | 1/2016 | Bannister | G06F 8/73 |
| | | | | 717/123 |

(Continued)

OTHER PUBLICATIONS

Petrosyan et al., Discovering information explaining API types using text classification, 11 pages (Year: 2015).*

(Continued)

*Primary Examiner* — Thuy Dao
(74) *Attorney, Agent, or Firm* — Maschoff Brennan

(57) ABSTRACT

A system may include a memory, a communication interface, and a processor operatively coupled to the communication interface. The processor may be configured to generate a set of classification models. The classification models may include one or more sentences associated with application program interface (API) documentations. The processor may also be configured to access one or more content sources for content. Additionally, the processor may be configured to determine whether one or more sentences in the content is the same or substantially similar to one or more sentences included in the classification models. In response to determining one or more sentences in the content is the same or substantially similar, the processor may be configured to collect the content as API documentation. Additionally, the processor may be configured to categorize different type of API documentations, such as REST API documentations, JAVA API documentations, etc.

13 Claims, 10 Drawing Sheets

(56) References Cited

U.S. PATENT DOCUMENTS

| | | | |
|---|---|---|---|
| 2017/0279691 A1* | 9/2017 | Williams | H04L 41/5077 |
| 2018/0121320 A1* | 5/2018 | Dolby | G06F 11/3608 |
| 2018/0196643 A1* | 7/2018 | Dolby | G06F 8/36 |
| 2018/0293517 A1* | 10/2018 | Browne | G06Q 10/00 |
| 2019/0188760 A1* | 6/2019 | Ekambaram | G06N 20/00 |

OTHER PUBLICATIONS

Pending U.S. Appl. No. 15/374,798, filed Dec. 9, 2016.

Unsupervised Feature Learning and Deep Learning Tutorial, ufldl.stanford.edu/tutorial/supervised/ConvolutionalNeuralNetwork/. Retrieved Feb. 2, 2018.

Recurrent neural network. https://en.wikipedia.org/wiki/Recurrent_neural_network. Retrieved Feb. 2, 2018.

Fan, R. E., Chang, K. W., Hsieh, C. J., Wang, X. R., & Lin, C. J. (2008). Liblinear: A library for large linear classification. Journal of machine learning research, (Aug.) 9, 1871-1874.

Schmidt, M., Le Roux, N., & Bach, F. (2017). Minimizing finite sums with the stochastic average gradient. Mathematical Programming, 162(1-2), 83-112.

Defazio, A., Bach, F., & Lacoste-Julien, S. (2014). SAGA: A fast incremental gradient method with support for non-strongly convex composite objectives. In Advances in neural information processing systems (pp. 1646-1654).

Yu, H. F., Huang, F. L., & Lin, C. J. (2011). Dual coordinate descent methods for logistic regression and maximum entropy models. Machine Learning, 85(1-2), 41-75.

\* cited by examiner

COLLECTION OF API DOCUMENTATIONS

FIELD

The embodiments discussed herein are related to collection of API documentations.

BACKGROUND

An Application Programming Interface (API) is a set of routines, protocols, and tools for building software applications. An API may return results to software components. An API typically exposes functions or data of a software application that enables other applications to use the API's resources without concern for implementation of the functions or data.

The subject matter claimed herein is not limited to embodiments that solve any disadvantages or that operate only in environments such as those described. Rather, this background is only provided to illustrate one example technology area where some embodiments described herein may be practiced.

SUMMARY

According to an aspect of an embodiment, a system may include a memory, a communication interface, and a processor operatively coupled to the communication interface. The processor may be configured to generate a set of classification models. The classification models may include one or more sentences associated with application program interface (API) documentations. The processor may also be configured to access one or more content sources as a content. Additionally, the processor may be configured to determine whether one or more sentences in the content is the same or substantially similar to one or more sentences included in the classification models. In response to determining one or more sentences in the content is the same or substantially similar, the processor may be configured to collect the content as API documentation.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
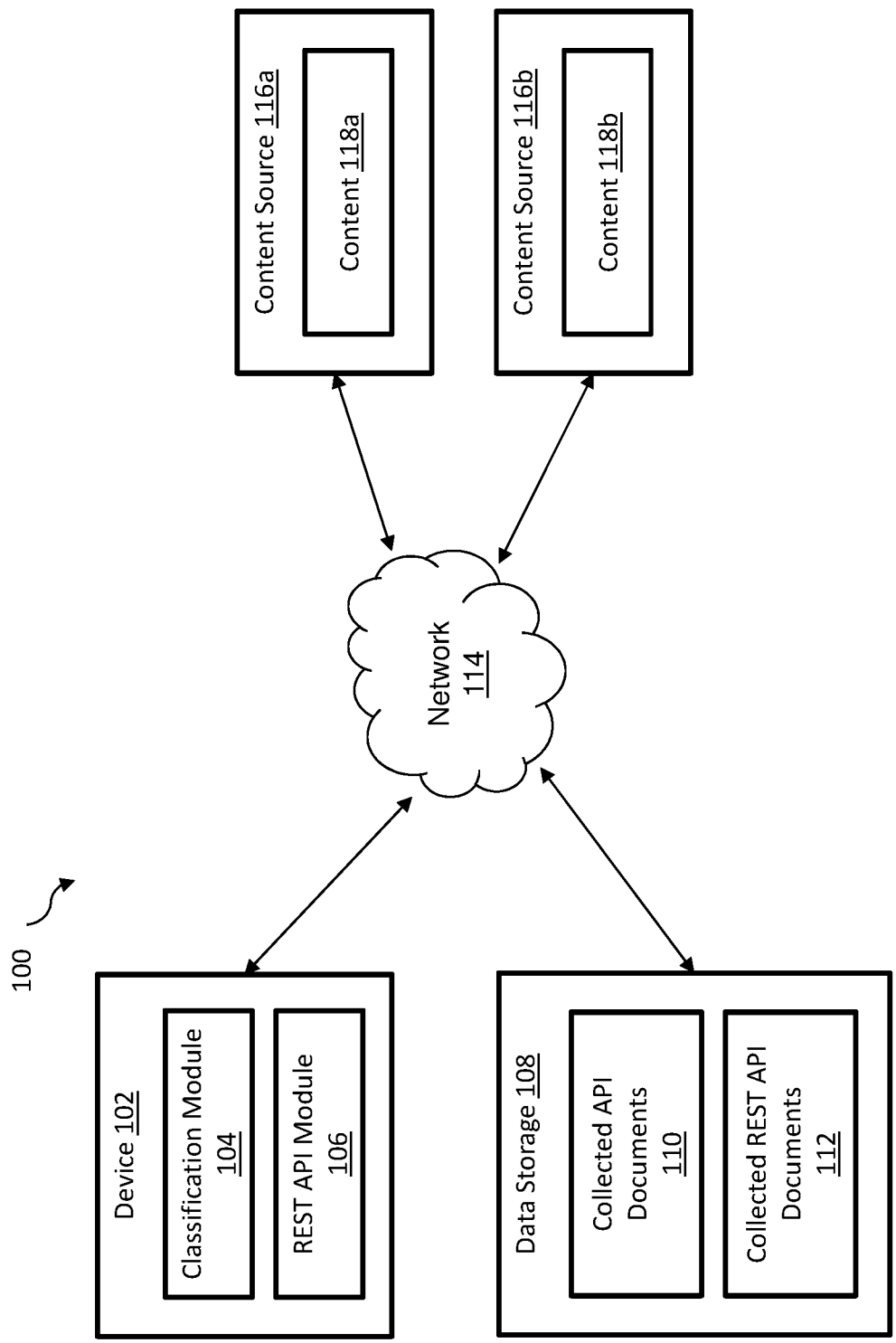
FIG. 1 illustrates a block diagram of an example operating environment of an API collection system.

There are several types of application programming interfaces (APIs). A web API, for example, may expose its functions and data through a web service in the Internet or an intranet network. A device API may expose device hardware modules functionalities to other devices and/or software. An application API may provide access to a database or a function of a software application, such as through an operating system. Typically, APIs may be useful for developers when implementing a new system based on services, functions or data provided from or through APIs. Conventional APIs often work as a "black box" that provide a service while the developer is not typically able to see inside the black box to identify details of the implementation. Some APIs may abstract the complexity of a system and some APIs may hide some details from developers that may reduce flexibility in the implementation.

Each API typically publishes its own services and/or data through different protocols having different types of data with different attributes. This conventional approach may cause a heterogeneously issue when a developer is working with a variety of APIs. Further, most APIs do not have formal definitions and most of them are human readable description which is described as an HTML file. As a result, software developers typically read and learn the API documentation in order to access and interact with an API function. API functionalities and their documentation can be updated periodically (e.g., using swagger or another tool), after which the developer will need to read and learn the new API documentation and then, revise his/her own application based on the new API functionalities. To further complicate software development, each API may be accessible through different programming languages.

Additionally, API publishers may use different tools to publish the APIs (e.g., publish API documentation). For example, API publishers may automatically publish APIs through the source code or the API publishers may manually publish the APIs. Example formats include hypertext markup language (HTML) format, portable document format (PDF), Microsoft word (DOC) format, or any other suitable format for publishing API documentations.

An electronic device (e.g., acting as a crawler) may automatically collect the various APIs and the various APIs may be locally stored for users. This may reduce the time a user spends looking for API documentation in various content sources. The electronic device may be configured to access a single content source at a time or the electronic device may be configured to access multiple content sources at the same time (e.g., in parallel).

The electronic device may generate a set of classification models that include one or more sentences associated with API documentations. The electronic device may use the classification models to determine whether content included in a content source includes API documentation or other documentations. The classification models may include sentences extracted from sample API documentations. The electronic device may compare the content included in the content source to the classification models. For example, the electronic device may compare the sentences included in the classification models to sentences included in the content. If the content includes API documentation, the electronic device may collect the API documentation and may store the API documentation as collected API documents for additional parsing and/or access by a user.

Likewise, the electronic device may generate a set of representational state transfer (REST) API models that include one or more REST API keywords associated with REST API documentation. The electronic device may use the REST API models to determine whether the content included in the content source includes REST API documentation or other documentations. The electronic device may extract the REST API keywords from sample REST API documentation. The electronic device may compare the content included in the content source to the REST API models. For example, the electronic device may compare a total number of REST API keywords and/or a frequency of each REST API keyword included in the content to the number and/or frequency of REST API keywords extracted from the sample REST API documentation. If the content includes REST API documentation, the electronic device may collect the REST API documentation and may store the REST API documentation as collected REST API documents for additional parsing and/or access by a user. Additionally, the electronic device may access the collected API documents to determine whether one or more of the collected API documents includes REST API documentations. Additionally, the electronic device may generate a set of API models that include one or more keywords in other formats. For example, a set of JAVA API models may be generated and used to determine whether the content included in the content source includes JAVA API documentation or other documentations.

For example, multiple websites (e.g., multiple content sources) may include multiple webpages (e.g., content) and/or different links (e.g., external and/or internal links). The electronic device may access each website and webpage by following the various links. The electronic device may determine whether any webpage includes API documentation by comparing each webpage to the classification models. If a webpage includes API documentation, the electronic device may collect and store that webpage as a collected API document. Additionally, the electronic device may determine whether any webpage includes REST API documentation by comparing each webpage or collected API document to the REST API models. If a webpage includes REST API documentation, the electronic device may collect and store that webpage and/or collected API document as a collected REST API document.

FIG. 1 illustrates a block diagram of an example operating environment 100 of an API collection system, arranged in accordance with at least one embodiment described herein. As depicted in FIG. 1, the operating environment 100 may include a device 102, at least one of content source 116a and content source 116b (collectively herein 'content sources 116'), a data storage 108, and a network 114.

The device 102 may include a computer-based hardware device that includes a processor, memory, and communication capabilities. The device 102 may be coupled to the network 114 to communicate data with any of the other components of the operating environment 100. Some examples of the device 102 may include a mobile phone, a smartphone, a tablet computer, a laptop computer, a desktop computer, a set-top box, a virtual-reality device, or a connected device, etc. The device 102 may include a processor-based computing device. For example, the device 102 may include a hardware server or another processor-based computing device configured to function as a server. The device 102 may include memory and network communication capabilities.

The content sources 116 may include any computer-based source for content (e.g., API documents, REST API documents, any other API documentations, or electronic content). For example, the content sources 116 may include a server, client computer, repository etc. The content source 116a may store content 118a and/or the content source 116b may store content 118b (collectively herein "content 118') in any electronic format. Further, the content 118 may be machine-readable and/or human readable. The content 118 may be in any language. For example, the content 118 may be in any target human language (e.g., English, Japanese, and German). In at least one embodiment, the content sources 116 may include an API information service offered by one electronic device to another electronic device, communicating with each other via the network 114 (e.g., the World Wide Web). Additionally, the content sources 116 may include a web site and the content 118 may include multiple webpages of the website.

The network 114 may include any communication network configured for communication of signals between any of the components (e.g., 102, 108, and 116) of the operating environment 100. The network 114 may be wired or wireless. The network 114 may have numerous configurations including a star configuration, a token ring configuration, or another suitable configuration. Furthermore, the network 114 may include a local area network (LAN), a wide area network (WAN) (e.g., the Internet), and/or other interconnected data paths across which multiple devices may communicate. In some embodiments, the network 114 may include a peer-to-peer network. The network 114 may also be coupled to or include portions of a telecommunications network that may enable communication of data in a variety of different communication protocols.

In some embodiments, the network 114 includes or is configured to include a BLUETOOTH® communication network, a Z-Wave® communication network, an Insteon® communication network, an EnOcean® communication network, a wireless fidelity (Wi-Fi) communication network, a ZigBee communication network, a HomePlug communication network, a Power-line Communication (PLC) communication network, a message queue telemetry transport (MQTT) communication network, a MQTT-sensor (MQTT-S) communication network, a constrained application protocol (CoAP) communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 114 may include data communicated via short messaging service (SMS), multimedia messaging service (MMS), hypertext transfer protocol (HTTP), direct data connection, wireless application protocol (WAP), e-mail, smart energy profile (SEP), ECHO-NET Lite, OpenADR, or any other protocol that may be implemented with the device 102, the content sources 116, a cloud server communication, or a gateway.

The data storage 108 may include any memory or data storage. The data storage 108 may include network communication capabilities such that other components in the operating environment 100 may communicate with the data storage 108. In some embodiments, the data storage 108 may include computer-readable storage media for carrying or having computer-executable instructions or data structures stored thereon. The computer-readable storage media may include any available media that may be accessed by a general-purpose or special-purpose computer, such as a processor. For example, the data storage 108 may include computer-readable storage media that may be tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may be included in the data storage 108.

The data storage 108 may store various data. The data may be stored in any data structure, such as a relational database structure. For example, the data storage 108 may include collected API documents 110 and collected REST API documents 112.

The device 102 may include a classification module 104 and a REST API module 106. In some embodiments, the classification module 104 and/or the REST API module 106 may include a stand-alone application ("app") that may be downloadable either directly from a host or from an application store or from the Internet. The device 102 may perform various operations relating to the API collection system and to the collection of API documents and REST API documents, as described in this disclosure.

In operation, the device 102 may access the one or more content sources 116 and the content 118 to determine whether the content 118 includes API documentation and/or REST API documentation.

The classification module 104 may use machine learning methods to identify language associated with different APIs based on sample API documents. The classification module 104 may generate a set of classification models via machine learning. Generation of the classification models via machine learning is discussed in more detail below in relation to FIG. 2. The classification module 104 may use the classification models to determine whether the content 118 includes API documentation. The classification module 104 is discussed in more detail below in relation to FIG. 3.

The REST API module 106 may use machine learning methods to identify REST API keywords associated with different REST APIs based on sample REST API documents. The REST API module 106 may generate a set of REST API models via machine learning. Generation of the REST API models via machine learning is discussed below in more detail in relation to FIG. 4. The REST API module 106 may use the REST API models to determine whether the content 118 and/or the collected API documents 110 include REST API documentation. The REST API module 106 is discussed in more detail below in relation to FIG. 5.

In some embodiments, the device 102 may configured as multiple crawlers configured to access the content sources 116 and the content 118 in parallel. For example, the device 102 may access the content 118a included in the content source 116a and the content 118b included in the content source 116b in parallel. The classification module 104 may compare the content 118 to the classification model. If one or more sentences included in the content 118 is the same or substantially similar to one or more sentences included in the classification models, the content 118 may be collected and sent to the data storage 108. The collected content 118 may be stored as collected API documents 110. The classification module 104 may repeat the process for each content source 116 and content 118 in the operating environment 100.

Likewise, the REST API module 106 may compare the content 118 included in the content sources 116 to the REST API models. If a total number of REST API keywords and/or a frequency of one or more REST API keywords included in the content 118 exceed a keywords threshold value and/or the frequency of any REST API keyword exceeds a frequency threshold value, the content 118 may be collected and sent to the data storage 108. In some embodiments, the keywords threshold value may be equal to or greater than twenty REST API keywords. Additionally or alternatively, the keywords threshold value may be less than twenty REST API keywords. In these and other embodiments, a maximum value for the keywords threshold value may be equal to one thousand REST API keywords. In some embodiments, the frequency threshold value for a REST API keyword being repeated may be greater than or equal to twenty times. Additionally or alternatively, the frequency threshold value for a REST API keyword being repeated may be less than twenty times. In these and other embodiments, a maximum value for the frequency threshold value may be equal to one thousand repeats of a REST API keyword. The collected content 118 may be stored as collected REST API documents 112. The REST API module 106 may repeat the process for each content source 116 and content 118 in the operating environment 100. Alternatively, the REST API module 106 may not compare all content 118 in the operating environment 100. Instead, the REST API module 106 may only compare collected API documents 110.

Additionally or alternatively, the content 118 may include multiple portions (e.g., multiple webpages) and the device 102 may perform this process with each portion included in the content 118. For example, the content sources 116 may include a website and the content 118 may include multiple webpages (referred to herein as "the website example"). In the website example, the device 102 may access each of the webpages and determine whether each webpage includes API documentation. The classification module 104 may compare each webpage to the classification models to determine whether one or more of the webpages include API documentation. If a webpage includes API documentation, the device 102 may collect the webpage and send the collected webpage to the data storage 108. The data storage 108 may store the webpage as a collected API document 110.

Furthermore, the device 102 may access each of the webpages and may determine whether each webpage includes REST API documentation. The REST API module 106 may compare each webpage to the REST API models to determine whether one or more of the webpages include REST API documentation. If a webpage includes REST API documentation, the device 102 may collect the webpage and send the collected web page to the data storage 108. The data storage 108 may store the webpage as a collected REST API document 112.

Alternatively, the REST API module 106 may compare webpages that are stored as collected API documents 110. The REST API module 106 may access each of the collected API documents 110 and may compare each of the collected API documents 110 to the REST API models to determine whether one or more of the collected API documents 110 includes REST API documentation. If a collected API document 110 includes REST API documentation, the collected API document 110 may also be collected and stored as a collected REST API document 112.

The collected API documents 110 and/or the collected REST API documents 112 may be stored in a natural language format. For example, the collected API documents 110 and/or the collected REST API documents 112 may be stored in a JavaScript object notation (JSON) format. Storing the collected API documents 110 and/or the collected REST API documents 112 may permit the collected API documents 110 and/or the collected REST API documents 112 to be further parsed and/or accessed by a user.

In some embodiments, the device 102 may be configured to perform automation browser based collection of the content 118. The content 118 may be compiled using one format and then may be provided in a different format. For example, the content 118 may be compiled in the JSON format and may be provided in a hypertext markup language (HTML) format. The device 102 may use browser based data collection. For example, the device 102 may use an internet browser to compile the webpage and collect the webpage as an HTML file.

FIGS. 2, 4, and 6-9 illustrate flow diagrams of example methods. The methods may be performed by processing logic that may include hardware (circuitry, dedicated logic, etc.), software (such as is run on a general purpose computer system or a dedicated machine), or a combination of both. The processing logic may be included in the device 102, classification module 104, and/or the REST API module 106 of FIG. 1, or another computer system or device. However, another system, or a combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

Figure 2:
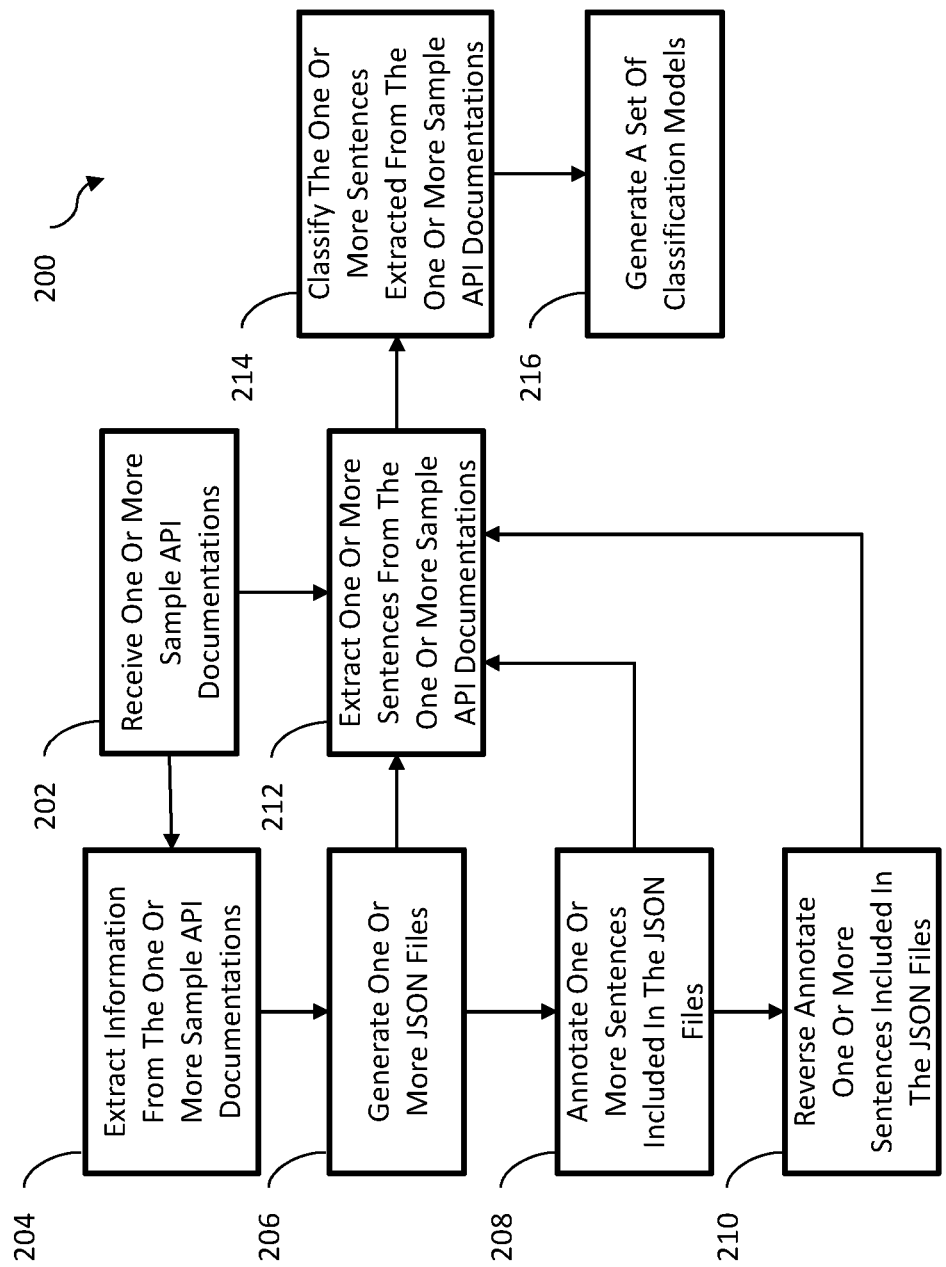
FIG. 2 illustrates a flow diagram of an example method related to generating a set of classification models.

FIG. 2 illustrates a flow diagram of an example method 200 related to generating a set of classification models, in accordance with at least one embodiment described herein. The method 200 may begin at block 202, where the processing logic may receive one or more sample API documentations. For example, the one or more sample API documentations may include information and one or more sentences that are associated with API documentation. Additionally or alternatively, the one or more sample API documentations may include information and/or sentences that are not associated with API documentation. In some embodiments, the one or more sample API documentations may include a list of web content that is prepared for processing.

At block 204, the processing logic may extract information from the one or more sample API documentations. For example, the information may be extracted and separated into individual parts, such as an API title, an API endpoint, parameters of an API endpoint, responses of an API endpoint, or any other suitable part of information included in API documentation.

At block 206, the processing logic may generate one or more JSON files. For example, the JSON files may be generated based on the information extracted from the sample API documentations. In some embodiments, each JSON file may include one or more parts of API information, such as the API title, the API endpoint, parameters of an API endpoint, responses of an API endpoint, or any other suitable part of information included in API documentation.

At block 208, the processing logic may annotate one or more sentences included in the JSON files. For example, the one or more sentences included in the JSON files may be annotated as positive sentences. Positive sentences may be related to API documentation. Additionally or alternatively, positive sentences may explain API functionality or other API related information. For example, a positive sentence may indicate a cost of an API call, parameters of an API, how to call an API, the policy of an API call, etc.

In some embodiments, the processing logic may annotate one or more sentences included in the JSON files based on user input received from a user. For example, a sentence may be provided to a user via a display and the user may provide input to annotate the sentence as a positive sentence, or the user may not annotate the sentence. Additionally or alternatively, the processing logic may annotate one or more sentences included in the JSON files based on sentences that previously have been annotated as positive sentences.

At block 210, the processing logic may reverse annotate one or more sentences included in the JSON files. For example, each sentence that was not annotated as a positive sentence may be reverse annotated as a negative sentence. A negative sentence may not be related to API documentation. For example, a negative sentence may indicate an application that does not offer API services. Additionally or alternatively, the processing logic may reverse annotate one or more sentences included in the JSON files based on sentences that previously have been annotated as positive sentences and/or sentences that previously have been reverse annotated as negative sentences.

At block 212, the processing logic may extract one or more sentences from the one or more sample API documentations. For example, the sentences may be extracted based on the one or more JSON files generated at block 206, the one or more sentences annotated at block 208, and/or the one or more sentences reverse annotated at block 210.

At block 214, the processing logic may classify the one or more sentences extracted from the one or more sample API documentations. For example, the one or more sentences may be classified based on the sentences annotated as positive sentences and/or the sentences reverse annotated as negative sentences. In some embodiments, the sentences may be classified using a convolutional neural network (CNN), recurrent neural network (RNN) or any other acceptable neural networks.

At block 216, the processing logic may generate a set of classification models. For example, the classification models may be generated based on the classification of the sentences extracted from the sample API documentations. In some embodiments, the classified sentences may be used to train the classification models to identify sentences that are related to API documentation and sentences that are not related to API documentation.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 3:
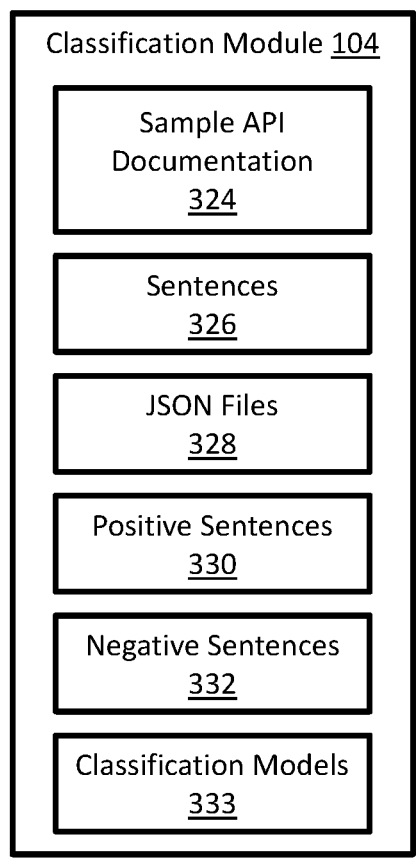
FIG. 3 illustrates a block diagram of an example classification module.

FIG. 3 illustrates a block diagram of an example classification module 104, in accordance with at least one embodiment described herein. The classification module 104 may include sample API documentation 324, one or more sentences 326, one or more JSON files 328, one or more positive sentences 330, one or more negative sentences 332, and a set of classification models 333. The classification module 104 may be the same or substantially similar to the classification module 104 of FIG. 1.

The sample API documentation 324 may include information and/or sentences that are associated with API documentation. Additionally or alternatively, the sample API documentation 324 may include information and/or sentences that are not associated with API documentation.

The sentences 326 may be extracted from the sample API documentation 324. Extracting the sentences 326 is discussed in more detail above in relation to FIG. 2. Additionally, the JSON files 328 may be generated based on information included in the sample API documentation 324. Generating the JSON files 328 is discussed in more detail above in relation to FIG. 2. Furthermore, one or more of the sentences 326 may be classified and stored as positive sentences 330. The positive sentences 330 may be associated with API documentation. For example, the positive sentences 330 may explain API functionality or other API related information. As another example, the positive sentences 330 may indicate a cost of an API call, parameters of an API, how to call an API, the policy of an API call, etc.

Additionally, one or more sentences 326 may be classified and stored as negative sentences 332. The negative sentences 332 may not be associated with API documentation. Classifying the sentences 326 as positive sentences 330 or negative sentences 332 is discussed in more detail above in relation to FIG. 2.

The classification models 333 may be generated based on the positive sentences 330 and/or the negative sentences 332. For example, the positive sentences 330 and/or the negative sentences 332 may be used to train the classification models 333 to identify sentences in content that are related to or are not related to API documentation. Generation of the classification models 333 is discussed in more detail above in relation to FIG. 2.

In the website example, the classification module 104 may extract text from the webpages in the website. The classification module 104 may compare the classification models 333 to the extracted text. Each sentence may be compared to sentences included in the classification models 333. If one or more sentences in the text and the classification models 333 are the same or substantially similar, the classification module 104 may collect and send the webpage to a data storage as a collected API document, for example, the data storage 108 and the collected API documents 110 of FIG. 1.

Figure 4:
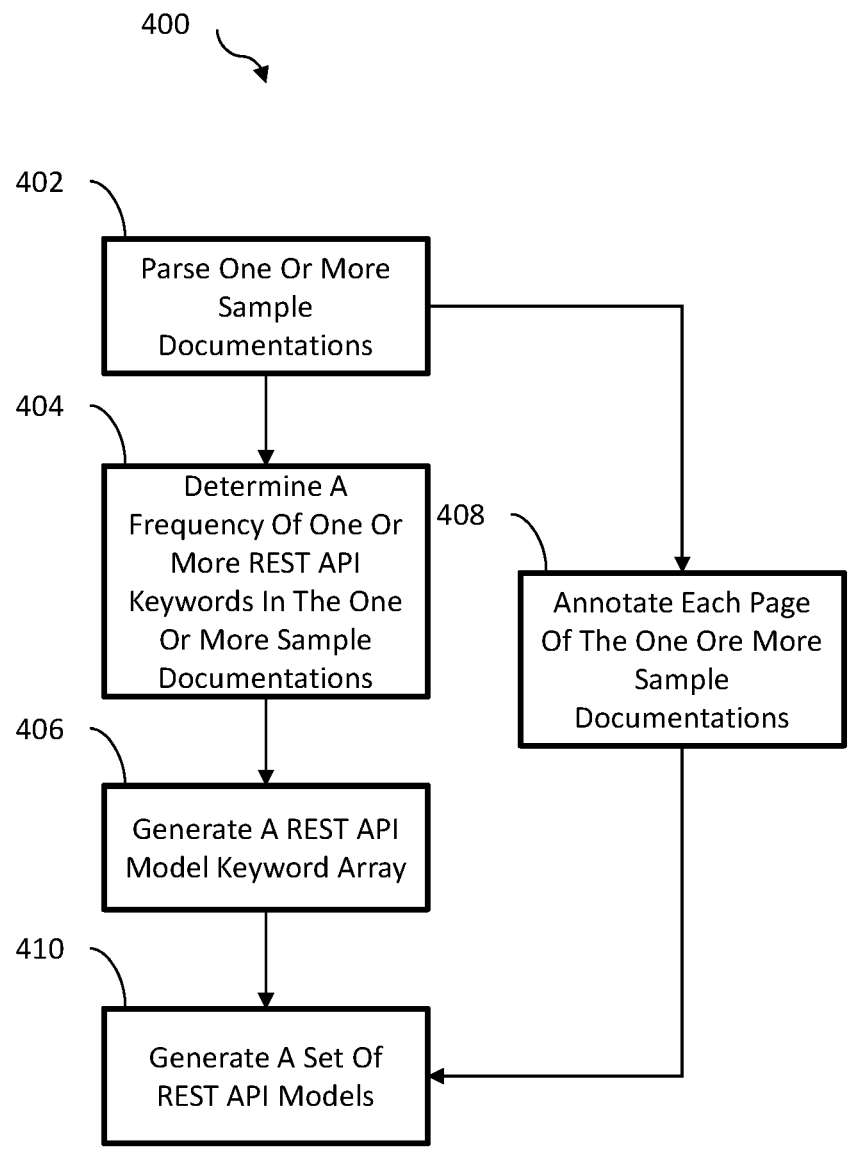
FIG. 4 illustrates a flow diagram of an example method related to generating a set of REST API models.

FIG. 4 illustrates a flow diagram of an example method 400 related to generating a set of REST API models, in accordance with at least one embodiment described herein. The method 400 may begin at block 402, where the processing logic may parse one or more sample documentations. For example, the one or more sample documentations may include one or more pages of text. The processing logic may extract the text from the one or more sample documentations. Additionally, stop words in a target language (e.g., English), signs, punctuation etc. may be removed from the text. For example, the word "the" is a stop word in English, exclamation points, other punctuation, may be removed from the text.

At block 404, the processing logic may determine a frequency of one or more REST API keywords in the one or more sample documentations. The processing logic may look up REST API keywords in the extracted text of the one or more sample documentations. REST API keywords may include, for example, GET, POST, PUSH, DELETE, etc. In some embodiments, the text of REST API keywords may include capital letters. The frequency of a particular REST API keyword may indicate how many times that particular REST API keyword appears in the extracted text.

At block 406, the processing logic may generate a REST API model keyword array. For example, a REST API model keyword array may be generated for each page of the extracted text of the one or more sample documentations. Further, for example, the REST API model keyword array may include all REST API keywords and the corresponding frequency of each REST API keyword in an associated page of the extracted text of one or more sample documentations. An example REST API model keyword array is provided in Table I.

TABLE I

| | Page 1 | Page 2 | . . . | Page M |
|---|---|---|---|---|
| Keyword 1 | TF = 1 | TF = 5 | . . . | TF = 6 |
| Keyword 2 | TF = 7 | TF = 3 | . . . | TF = 12 |
| . . . | . . . | . . . | . . . | . . . |
| Keyword N | TF = 4 | TF = 9 | . . . | TF = 0 |

In Table I, TF stands for term frequency and may indicate the frequency of a REST API keyword in a corresponding page of the text extracted from the one or more sample documentations.

Block 408 may follow block 402, at block 408, the processing logic may annotate each page of the one or more sample documentations. Each page may be annotated as a positive page or a negative page. Positive pages may be related to API documentation. Negative pages may not be related to API documentation. In some embodiments, an additional row may be added to the REST API model keyword array to indicate whether a page is a positive page or a negative page. For example, fields in the additional row associated with positive pages may include "1" and fields in the additional row associated with negative pages may include "0." Table II is an example REST API model keyword array including annotation of each page.

TABLE II

|  | Page 1 | Page 2 | ... | Page M |
| --- | --- | --- | --- | --- |
| Keyword 1 | TF = 1 | TF = 5 | ... | TF = 6 |
| Keyword 2 | TF = 7 | TF = 3 | ... | TF = 12 |
| ... | ... | ... | ... | ... |
| Keyword N | TF = 4 | TF = 9 | ... | TF = 0 |
| Annotation | 1 | 1 | ... | 0 |

In some embodiments, the processing logic may annotate each page as a positive page or a negative page based on user input received from a user. A page may be provided to a user via a display and the user may annotate the page as a positive page or a negative page.

At block 410, the processing logic may generate a set of REST API models. The REST API models may be generated based on the updated REST API model keyword array.

Additionally or alternatively, the REST API models may be generated using machine learning algorithms. For example, the REST API models may be generated using Equation 1 (e.g., a logistic regression equation).

$$\min_{w,c} \frac{1}{2} w^T w + C \sum_{i=1}^{n} \log(\exp(-y_i(X_i^T w + c)) + 1 \quad \text{Equation 1}$$

In Equation 1, X is the input array (e.g., the updated TF REST API keyword array), y is a training array that provides information on each page if it is a REST API page, w is a coefficient vector, C is an inverse of regularization strength, and T represents a matrix transpose operation. The logistisc regression equation may be a linear model known as maximum entropy classification to find maximum entropy between zero and negative one. Additionally or alternatively, the REST API models may be generated using any trained API model.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 5:
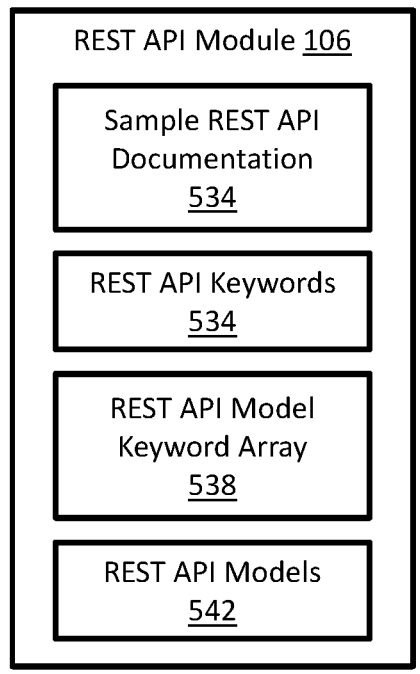
FIG. 5 illustrates a block diagram of an example REST API module.

FIG. 5 illustrates a block diagram of an example REST API module 106, in accordance with at least one embodiment described herein. The REST API module 106 may include sample REST API documentation 534, one or more REST API keywords 536, a REST API model keyword array 538, and a set of REST API models 542. The REST API module 106 may be the same or substantially similar to the REST API module 106 of FIG. 1.

The sample REST API documentation 534 may include documentation that is associated with REST API documentation. The sample REST API documentation 534 may include extracted text. For example, the sample REST API documentation may include text that has had stop words, signs, and/or punctuation removed from the text.

The REST API keywords 536 may include a list of known REST API keywords. For example, REST API keywords may include GET, POST, PUSH, DELETE, etc. The REST API model keyword array 538 may include a list of keywords and a frequency of each keyword appearing in the sample REST API documentation 534. Generation of the REST API model keyword array is discussed in more detail above in relation to FIG. 4.

The REST API models 542 may be generated based on the REST API model keyword array 538. For example, the REST API model keyword array 538 may be used to train the REST API models 542 to identify a frequency and/or a total number of REST API terms in a page that are related to or are not related to REST API documentation. Generation of the REST API models 542 is discussed in more detail above in relation to FIG. 4.

In the website example, the REST API module 106 may extract REST API keywords from the webpages in the website. The REST API module 106 may compare the REST API models 542 to the extracted text. A total number of REST API keywords and/or a frequency of each REST API keywords in the text may be compared to a keywords threshold value and/or a frequency threshold value included in the REST API models 542. If the total number of REST API keywords and/or the frequency of one or more REST API keywords in the text exceeds the threshold value and/or the frequency threshold value, the REST API module 106 may collect and send the webpages to a data storage as a collected REST API document, for example, the data storage 108 and the collected REST API documents 112 of FIG. 1.

Figure 6:
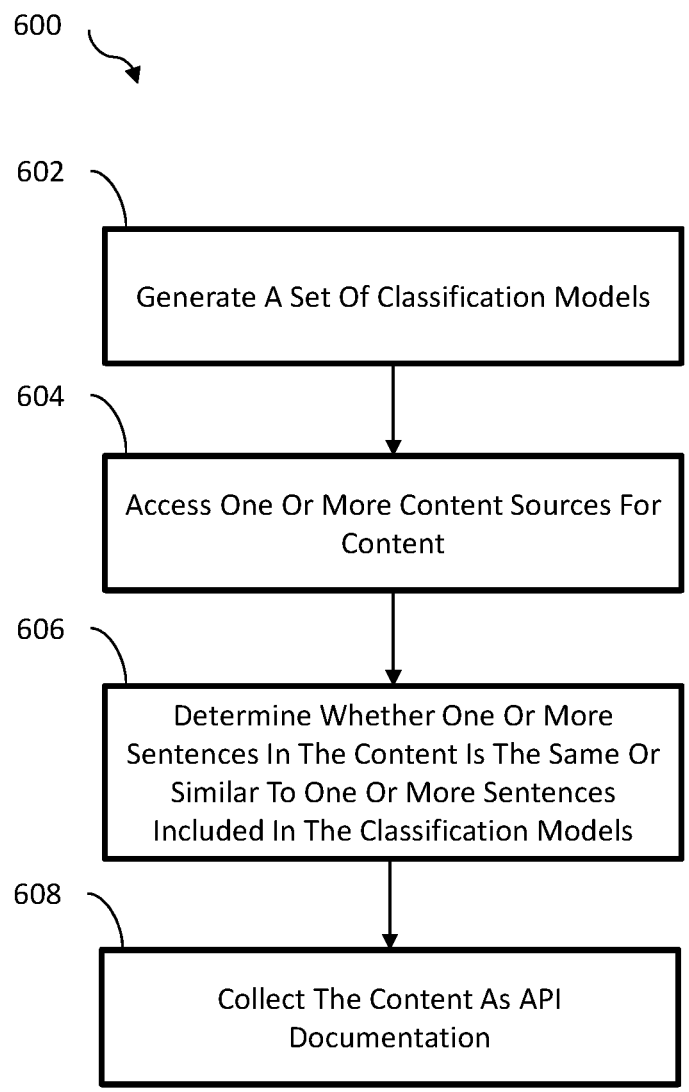
FIG. 6 illustrates a flow diagram of an example method related to determining whether content is API documentation.

FIG. 6 illustrates a flow diagram of an example method 600 related to determining whether content is API documentation, in accordance with at least one embodiment described herein. The method 600 may begin at block 602, where the processing logic may generate a set of classification models. Generation of the classification models is discussed in more detail above in relation to FIG. 2.

At block 604, the processing logic may access one or more content sources for content. For example, the processing logic may access the content sources 116 for the content 118 of FIG. 1. In the website example, the processing logic may access the website for the webpages.

At block 606, the processing logic may determine whether one or more sentences in the content is the same or substantially similar to one or more sentences included in the classification models. For example, the processing logic may compare one or more sentences in the content to the sentences included in the classification models and if one or more sentence are the same or substantially similar, the content may be API documentation. In the website example, the processing logic may determine whether one or more sentences in each webpage is the same or substantially similar to one or more sentences included in the classification models.

At block 608, the processing logic may collect the content as API documentation. For example, the content may collected and stored in the data storage 108 as collected API documents 110 of FIG. 1. In the website example, the processing logic collect a webpage identified as API documentation and send the webpage to the data storage.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 7:
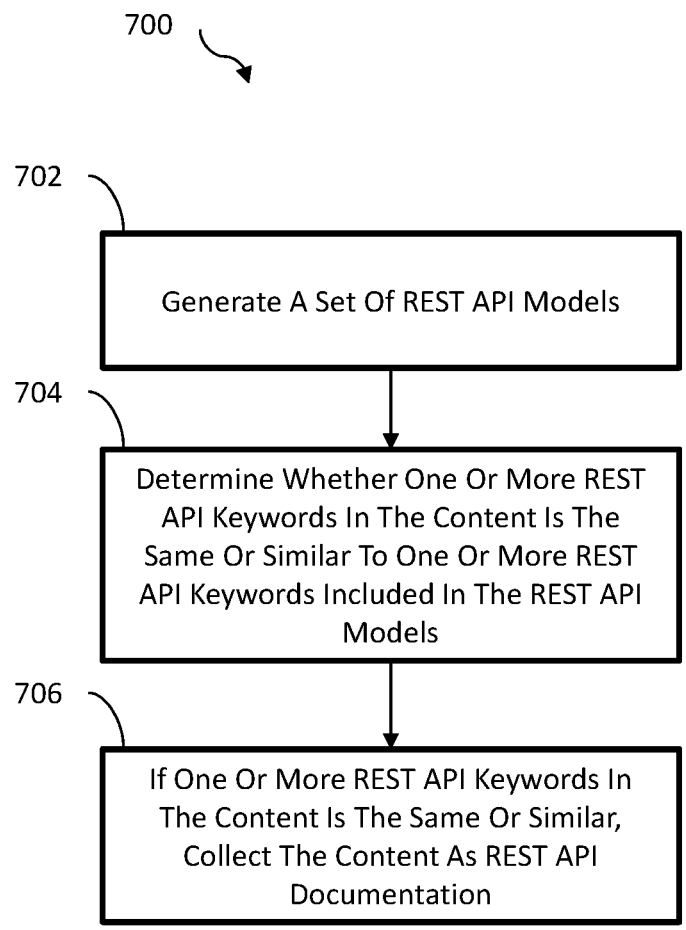
FIG. 7 illustrates a flow diagram of an example method related to determining whether content is REST API documentation.

FIG. 7 illustrates a flow diagram of an example method 700 related to determining whether content is REST API documentation, in accordance with at least one embodiment described herein. The method 700 may begin at block 702, where the processing logic may generate a set of REST API models. Generation of the REST API models is discussed in more detail above in relation to FIG. 4.

At block 704, the processing logic may determine whether one or more REST API keywords in the content is the same or substantially similar to one or more REST API keywords included in the REST API models. In the website example, the processing logic may determine whether one or more REST API keywords in the webpages is the same or substantially similar to one or more REST API keywords in the REST API models.

At block 706, if one or more REST API keywords in the content is the same or substantially similar, the processing logic may collect the content as REST API documentation. The REST API documentation may be stored as a collected REST API document. For example, the content may be stored by the data storage 108 as a collected REST API document 112 of FIG. 1. In web site example, webpages identified as REST API documentation may be collected and stored as collected REST API documents. In the website example, the webpages may be collected and stored as collected REST API documents.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 8:
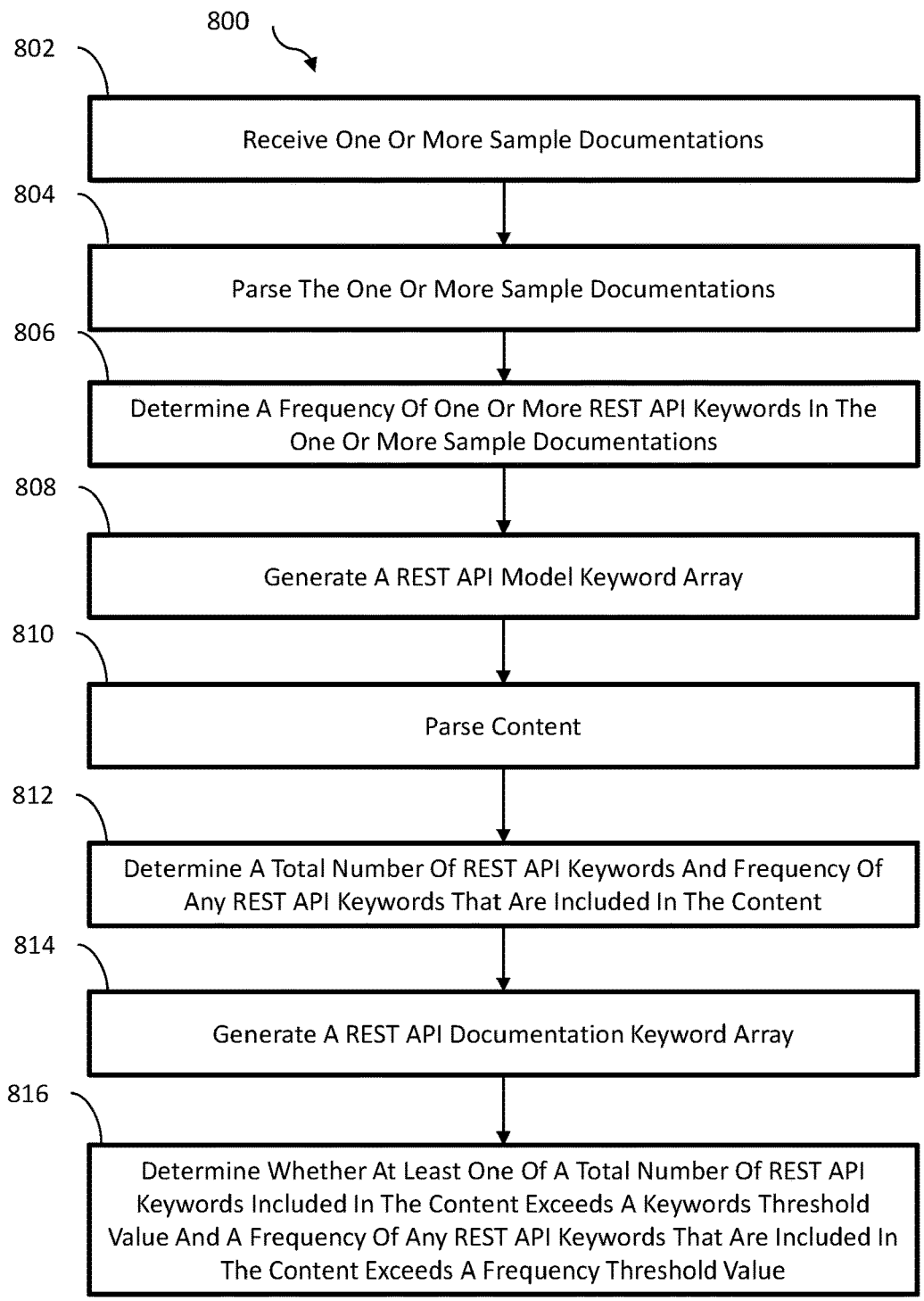
FIG. 8 illustrates a flow diagram of another example method related to determining whether content is REST API documentation.

FIG. 8 illustrates a flow diagram of another example method 800 related to determining whether content is REST API documentation, in accordance with at least one embodiment described herein. The method 800 may begin at block 802, where the processing logic may receive one or more sample documentations.

At block 804, the processing logic may parse the one or more sample documentations. For example, the one or more sample documentations may include one or more pages of text. The processing logic may extract the text from the from the one or more sample documentations. Additionally, stop words, signs, etc. may be removed from the text. For example, the word "the," exclamation points, other punctuation, etc. may be removed from the text.

At block 806, the processing logic may determine a frequency of one or more REST API keywords in the one or more sample documentations. The processing logic may look up REST API keywords in the parsed text of the one or more sample API documentations. REST API keywords may include, for example, GET, POST, PUSH, DELETE, etc. The frequency of a REST API keyword may indicate how many times a particular REST API keyword appears in the parsed text.

At block 808, the processing logic may generate a REST API model keyword array. For example, a REST API model keyword array may be generated for each page of the one or more sample documentations. Further, for example, the REST API model keyword array may include all REST API keywords and the corresponding frequency of each REST API keyword in an associated page of the one or more sample documentations. An example REST API model keyword array is provided in Table I above.

At block 810, the processing logic may parse content. The processing logic may extract text from the content. Additionally, stop words, signs, etc. may be removed from the text of the content. The content being parsed may include the content 118 of FIG. 1. In the website example, the processing logic may parse text included in the webpages of the website.

At block 812, the processing logic may determine a total number of REST API keywords and frequency of any REST API keywords that are included in the content. For example, the processing logic may count a total number of times REST API keywords and/or a frequency each REST API keyword is found in the text. In the website example, the processing logic may determine a total number of REST API keywords and frequency of any REST API keywords included in the webpages.

At block 814, the processing logic may generate a REST API documentation keyword array. The REST API documentation keyword array may be generated based on the total number of REST API keywords and/or the frequency of any REST API keywords that are included in the content. In the website example, the processing logic may generate a REST API documentation keyword array for each webpage in the website.

At block 816, the processing logic may determine whether at least one of a total number of REST API keywords included in the content exceeds a keywords threshold value and a frequency of any REST API keywords that are included in the content exceeds a frequency threshold value. If the total number of REST API keywords included in the content exceeds a keywords threshold value and/or a frequency of any REST API keywords that are included in the content exceeds a frequency threshold value, the processing logic may collect the content as REST API documentation.

In the website example, the processing logic may determine whether at least one of a total number of REST API keywords included in a webpage exceeds a keywords threshold value and a frequency of any REST API keywords that are included in a webpage exceeds a frequency threshold value. If the total number of REST API keywords included in a webpage exceeds a keywords threshold value and/or a frequency of any REST API keywords that are included in a webpage exceeds a frequency threshold value, the processing logic may collect the webpage as REST API documentation One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 9:
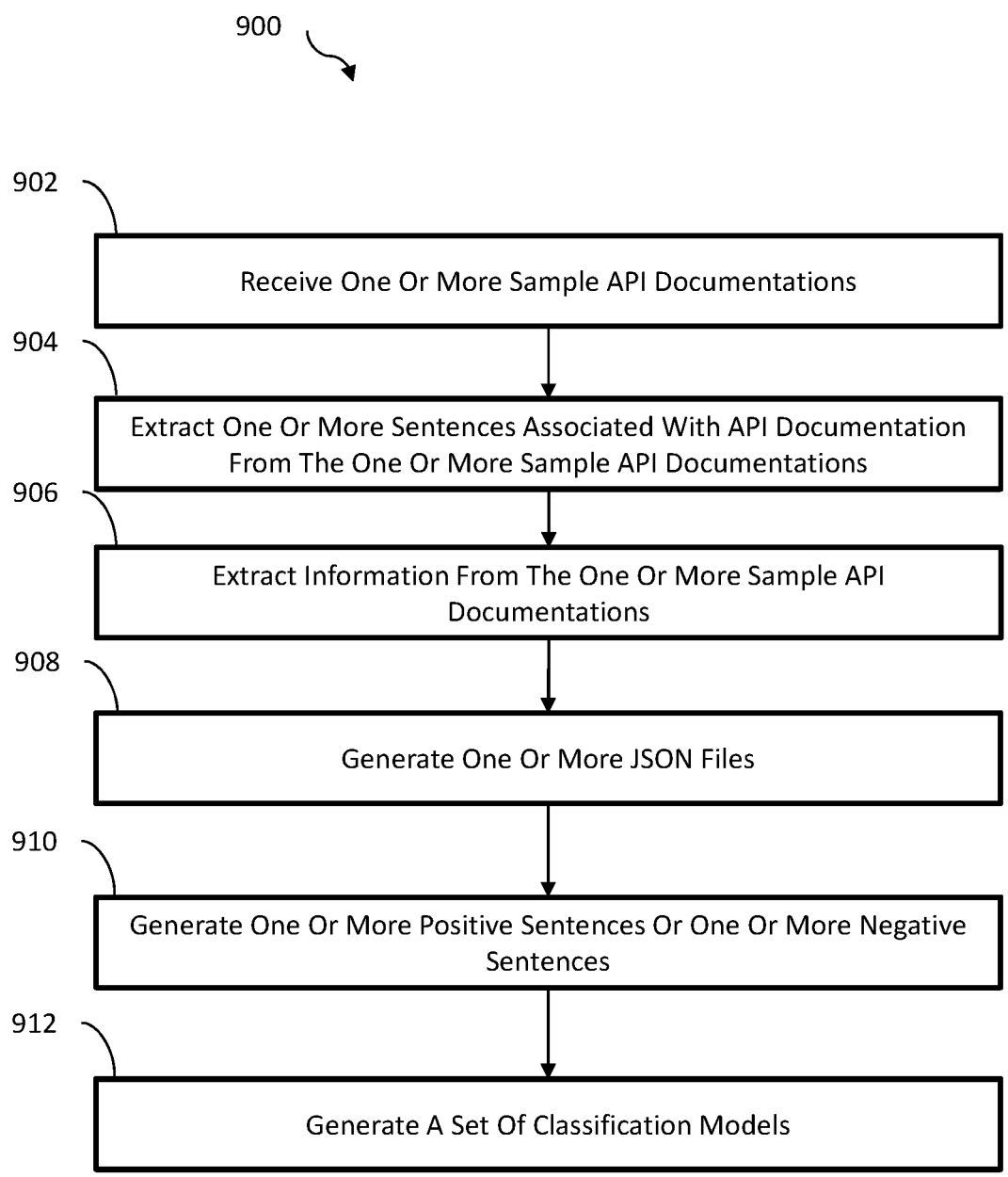
FIG. 9 illustrates a flow diagram of an example method related to generating a set of classification models.

FIG. 9 illustrates a flow diagram of an example method related to generating a set of classification models, in accordance with at least one embodiment described herein. The method 900 may begin at block 902, where the processing logic may receive one or more sample API documentations. The one or more sample API documentations may include, for example, information and one or more sentences that are associated with API documentation. Additionally or alternatively, the one or more sample API documentations may include information and/or sentences that are not associated with API documentation. In some embodiments, the one or more sample API documentations may include a list of web content that is prepared for processing.

At block 904, the processing logic may extract one or more sentences associated with API documentation from the one or more sample API documentations. For example, the sentences may be extracted based on the one or more JSON files generated at block 908 and/or the one or more positive sentences or one or more negative sentences generated at block 910.

At block 906, the processing logic may extract information from the one or more sample API documentations. For example, the information may be extracted and separated into individual parts, such as an API title, an API endpoint, parameters of an API endpoint, responses of an API endpoint, or any other suitable part of information included in API documentation.

At block 908, the processing logic may generate one or more JSON files. The JSON files may be generated based on the information from the one or more sample API documentations. In some embodiments, each JSON file may include one or more parts of API information, such as the API title, the API endpoint, parameters of an API endpoint, responses of an API endpoint, or any other suitable part of information included in API documentation.

At block 910, the processing logic may generate one or more positive sentences or one or more negative sentences. The one or more sentences included in the JSON files may be annotated as positive sentences. Positive sentences may be related to API documentation. Additionally or alternatively, positive sentences may explain API functionality or other API related information. For example, a positive sentence may indicate a cost of an API call, parameters of an API, how to call an API, the policy of an API call, etc. A negative sentence may not be related to API documentation. For example, a negative sentence may indicate an application that does not offer API services.

In some embodiments, the processing logic may annotate one or more sentences included in the JSON files based on user input received from a user. A sentence may be provided to a user via a display and the user may provide input to annotate the sentence as a positive sentence or a negative sentence.

At block 912, the processing logic may generate a set of classification models. For example, the classification models may be generated based on the one or more positive sentences and/or the one or more negative sentences.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 10:
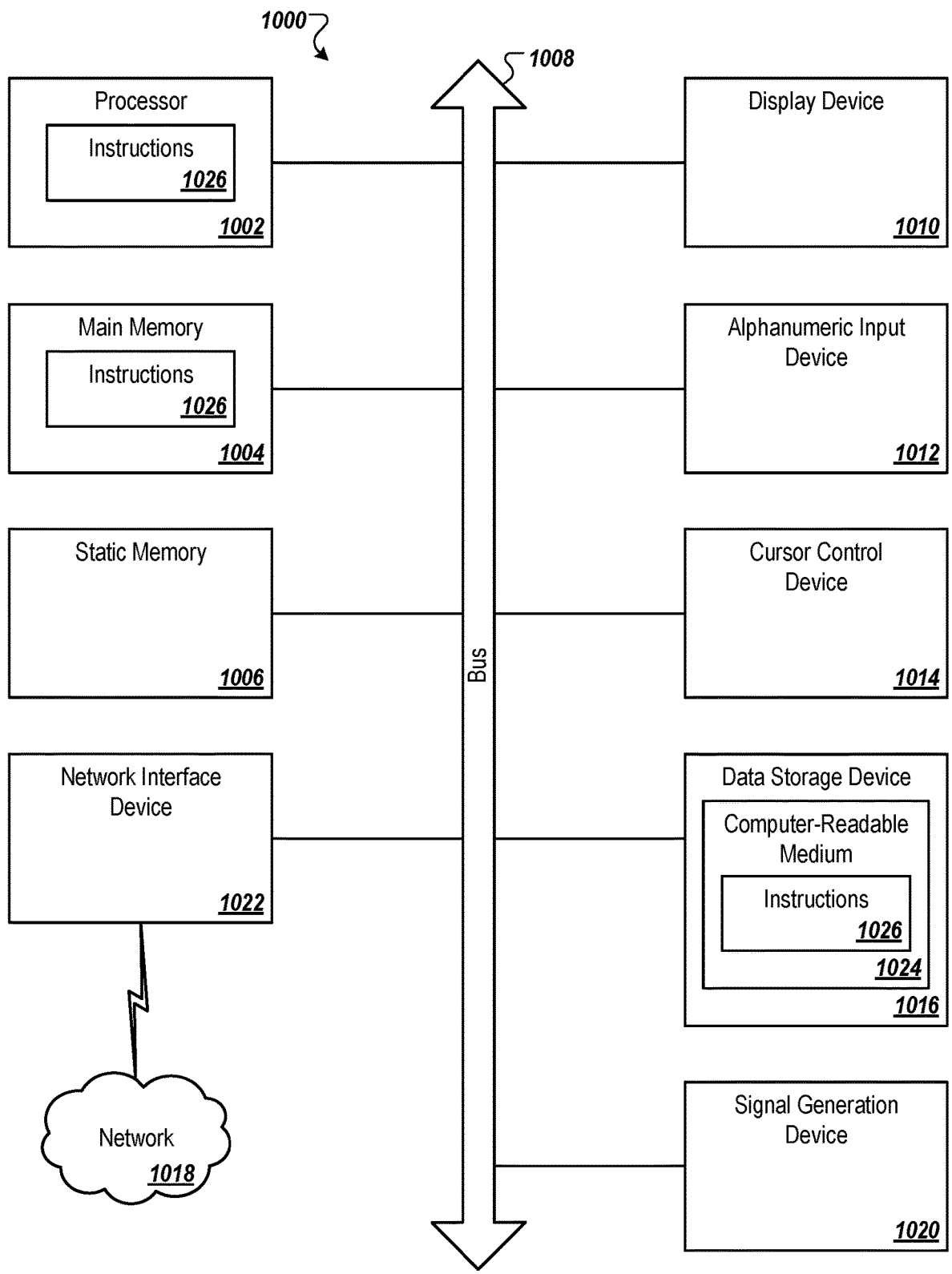
FIG. 10 illustrates a diagrammatic representation of a machine in the example form of a computing device within which a set of instructions, for causing the machine to perform any one or more of the methods discussed herein, may be executed, all arranged in accordance with at least one embodiment described herein.

FIG. 10 illustrates a diagrammatic representation of a machine in the example form of a computing device 1000 within which a set of instructions, for causing the machine to perform any one or more of the methods discussed herein, may be executed. The computing device 1000 may include a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in a client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 1000 includes a processing device (e.g., a processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)) and a data storage device 1016, which communicate with each other via a bus 1008.

Processing device 1002 represents one or more general-purpose processing devices such as a microprocessor, central processing unit, or the like. More particularly, the processing device 1002 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also include one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps discussed herein.

The computing device 1000 may further include a network interface device 1022, which may communicate with a network 1018. The computing device 1000 also may include a display device 1010 (e.g., a liquid crystal display (LCD) or a cathode ray tube (CRT)), an alphanumeric input device 1012 (e.g., a keyboard), a cursor control device 1014 (e.g., a mouse) and a signal generation device 1020 (e.g., a speaker). In one implementation, the display device 1010, the alphanumeric input device 1012, and the cursor control device 1014 may be combined into a single component or device (e.g., an LCD touch screen).

The data storage device 1016 may include a computer-readable storage medium 1024 on which is stored one or more sets of instructions 1026 (e.g., device 102, classification module 104, and REST API module 106) embodying any one or more of the methods or functions described herein. The instructions 1026 may also reside, completely or at least partially, within the main memory 1004 and/or within the processing device 1002 during execution thereof by the computing device 1000, the main memory 1004 and the processing device 1002 also constituting computer-readable media. The instructions may further be transmitted or received over a network 1018 via the network interface device 1022.

While the computer-readable storage medium 1024 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A system, comprising:
  a memory;
  a communication interface; and
  a processor operatively coupled to the memory and the communication interface, the processor configured to perform operations comprising:
    generate a set of classification models, the classification models include one or more sentences associated with application program interface (API) documentation;
    access, via the communication interface, one or more content sources as a content;
    determine whether one or more sentences in the content is the same as one or more sentences included in the classification models;
    in response to determining one or more sentences in the content is the same, identify the content as API documentation and collect the content as API documentation;
    receive a plurality of sample documentations, at least one sample documentation of the plurality of sample documentations being a representational state transfer (REST) API documentation, each REST API documentation associated with one or more REST API keywords;
    determine a frequency of the one or more REST API keywords in each sample documentation of the plurality of sample documentations;
    generate a REST API model keyword array for the plurality of sample documentations based on the one or more REST API keywords and the frequency of the one or more REST API keywords in each sample documentation of the plurality of sample documentations, the REST API model keyword array indicating whether each sample documentation of the plurality of sample documentations is associated with a REST API;
    generate a set of REST API models based on the REST API model keyword array;
    identify one or more REST API keywords in the content;
    determine whether the one or more REST API keywords identified in the content are the same as one or more REST API keywords included in the REST API models; and
    in response to determining the one or more REST API keywords in the content are the same, further identify the content as REST API documentation and further collect the content as REST API documentation.

2. The system of claim 1, wherein the operation collect the content as REST API documentation comprises:
  determine a total number of the identified one or more REST API keywords and a frequency of the one or more REST API keywords that are included in the content;
  generate a REST API documentation keyword array based on the total number of REST API keywords and frequency of any REST API keywords that are included in the content; and
  determine whether at least one of the total number of REST API keywords included in the content exceeds a keywords threshold value and the frequency of any REST API keywords that are included in the content exceeds a frequency threshold value, wherein the content is collected as REST API documentation based on whether at least one of the total number of REST API keywords exceeds the keywords threshold value and the frequency of any REST API keywords exceeds the frequency threshold value.

3. The system of claim 1, wherein the processor generates the REST API models according to a trained API model.

4. The system of claim 1, wherein the operation generate a set of classification models comprises:
  receive one or more sample API documentations;
  extract one or more sentences associated with API documentation from the one or more sample API documentations;
  extract information from the one or more sample API documentations;
  and
  generate one or more positive sentences or one or more negative sentences based on the extracted one or more sentences and based on the extracted information, wherein the classification models are generated based on at least one of the one or more positive sentences and the one or more negative sentences.

5. The system of claim 1, wherein the content includes at least one of a web-based API documentation, a device API documentation, and an operating system-based API documentation.

6. A method, comprising:
  accessing one or more content sources as a content;
  receiving a plurality of sample documentations, at least one sample documentation of the plurality of sample documentations being a representational state transfer (REST) API documentation, each REST API documentation associated with one or more REST API keywords;
  determining a frequency of the one or more REST API keywords in each sample documentation of the plurality of sample documentations;
  generating a REST API model keyword array for the plurality of sample documentations based on the one or more REST API keywords and the frequency of the one or more REST API keywords in each sample documentation of the plurality of sample documentations, the REST API model keyword array indicating whether each sample documentation of the plurality of sample documentations is associated with a REST API;
  generating a set of REST API models based on the REST API model keyword array;
  identifying one or more REST API keywords in the content;
  determining whether the one or more REST API keywords identified in the content are the same as one or more REST API keywords included in the classification REST API models; and
  in response to determining the one or more sentences REST API keywords in the content are the same, identifying the content as REST API documentation and collecting the content as REST API documentation.

7. The method of claim 6, wherein collecting the content as REST API documentation comprises:
  determining a total number of the identified one or more REST API keywords and a frequency of the one or more REST API keywords that are included in the content;
  generating a REST API documentation keyword array based on the total number of REST API keywords and frequency of any REST API keywords that are included in the content; and
  determining whether at least one of the total number of REST API keywords included in the content exceeds a keywords threshold value and the frequency of any REST API keywords that are included in the content exceeds a frequency threshold value, wherein the content is collected as REST API documentation based on whether at least one of the total number of REST API keywords exceeds the keywords threshold value and the frequency of any REST API keywords exceeds the frequency threshold value.

8. The method of claim 6, wherein the REST API models are generated according to a trained API model.

9. A non-transitory computer-readable medium having encoded therein, programming code executable by a processor to perform operations comprising:
  generating a set of classification models, the classification models includes one or more sentences associated with API documentation, wherein generating the set of classification models comprises:
    receiving one or more sample API documentations;
    extracting one or more sentences associated with API documentation from the one or more sample API documentations;
    extracting information from the one or more sample API documentations; and
    generating one or more positive sentences or one or more negative sentences based on the extracted one or more sentences and based on the extracted information, wherein the classification models are generated based on at least one of the one or more positive sentences and the one or more negative sentences;
  accessing one or more content sources as a content;
  determining whether one or more sentences in the content is the same as one or more sentences included in the classification models;
  in response to determining one or more sentences in the content is the same, identifying the content as API documentation and collecting the content as API documentation;
  receiving a plurality of sample documentations, at least one sample documentation of the plurality of sample documentations being a REST API documentation, each REST API documentation associated with one or more REST API keywords;
  determining a frequency of the one or more REST API keywords in each sample documentation of the plurality of sample documentations;
  generating a REST API model keyword array for the plurality of sample documentations based on the one or more REST API keywords and the frequency of the one or more REST API keywords in each sample documentation of the plurality of sample documentations, the REST API model keyword array indicating whether each sample documentation of the plurality of sample documentations is associated with the REST API; and
  generating a set of REST API models based on the REST API model keyword array.

10. The non-transitory computer-readable medium of claim 9, the operations further comprising:
  determining whether one or more REST API keywords in the content is the same as one or more REST API keywords included in the REST API models; and
  in response to determining one or more REST API keywords in the content is the same as one or more REST API keywords included in the REST API models, collecting the content as REST API documentation.

11. The non-transitory computer-readable medium of claim 10, the operation collecting the content as REST API documentation comprising:

determining a total number of REST API keywords and frequency of any REST API keywords that are included in the content;

generating a REST API documentation keyword array based on the total number of REST API keywords and frequency of any REST API keywords that are included in the content; and determining whether at least one of the total number of REST API keywords included in the content exceeds a keywords threshold value and the frequency of any REST API keywords that are included in the content exceeds a frequency threshold value, wherein the content is collected as REST API documentation based on whether at least one of the total number of REST API keywords exceeds the keywords threshold value and the frequency of any REST API keywords exceeds the frequency threshold value.

12. The non-transitory computer-readable medium of claim 9, wherein the REST API models are generated according to a trained API model.

13. The non-transitory computer-readable medium of claim 9, wherein the content includes at least one of a web-based API documentation, a device API documentation, or an operating system-based API documentation.

* * * * *